(12) United States Patent
Shimizu et al.

(10) Patent No.: US 11,371,872 B2
(45) Date of Patent: Jun. 28, 2022

(54) INSPECTION DEVICE AND INSPECTION METHOD

(71) Applicant: HONDA MOTOR CO., LTD., Tokyo (JP)

(72) Inventors: Hiroomi Shimizu, Tochigi (JP); Hiroaki Matsumoto, Tochigi (JP); Kenji Miyanaga, Tochigi (JP); Junji Nakajima, Tochigi (JP); Hiroshi Kunieda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 497 days.

(21) Appl. No.: 16/361,542

(22) Filed: Mar. 22, 2019

(65) Prior Publication Data

US 2019/0301917 A1 Oct. 3, 2019

(30) Foreign Application Priority Data

Mar. 27, 2018 (JP) .............................. JP2018-059483

(51) Int. Cl.
*G01B 21/08* (2006.01)
*G01F 23/292* (2006.01)
*B05C 11/00* (2006.01)

(52) U.S. Cl.
CPC ............ *G01F 23/292* (2013.01); *B05C 11/00* (2013.01); *G01B 21/08* (2013.01)

(58) Field of Classification Search
CPC ... G01B 17/025; G01B 11/0616; G01B 21/08
See application file for complete search history.

(56) References Cited

U.S. PATENT DOCUMENTS 3,964,683 A * 6/1976 Gimple .................. B05B 5/032
 239/691
4,053,227 A * 10/1977 Bodlaj ............... G01B 11/0608
 356/3.02

(Continued)

FOREIGN PATENT DOCUMENTS

CN 101398365 A 4/2009
CN 103018603 A 4/2013

(Continued)

OTHER PUBLICATIONS

Kei, Powder coating apparatus, Aug. 29, 2013, Machine translation of JP2013-166099 (Year: 2013).*
Chinese Office Action dated Aug. 21, 2020, 9 pages.

*Primary Examiner* — Lisa M Caputo
*Assistant Examiner* — Alex T Devito
(74) *Attorney, Agent, or Firm* — Rankin, Hill & Clark LLP (57) ABSTRACT

First to eighth laser measurement sections (30a) to (30h) of a laser measurement unit (30) measures a height of a surface of powder resins (15) in a coil insertion range CA for every angular degree in a circumferential direction of a stator core (2). A control unit (18) computes the number of points where the height of the surface is lower than a predetermined height among measurement results at multiple points measured by the first to eighth laser measurement sections (30a) to (30h), where the number of points is defined as an index value indicative of a dispersion of the measurement results. When it has been determined that the index value exceeds a first predetermined value, a notification is issued by outputting from a speaker (32) a sound indicative of the fact that the index value that has been computed exceeds the first predetermined value.

6 Claims, 8 Drawing Sheets

(56) References Cited

U.S. PATENT DOCUMENTS

| | | | | |
|---|---|---|---|---|
| 4,084,902 A * | 4/1978 | Green | ............... | G01B 11/06 |
| | | | | 356/340 |
| 4,894,551 A * | 1/1990 | Kishimoto | ......... | G01B 11/245 |
| | | | | 250/559.23 |
| 4,947,683 A * | 8/1990 | Minear | ............. | G01F 1/663 |
| | | | | 73/152.32 |
| 5,092,267 A * | 3/1992 | Hajek | ............... | B05B 7/1477 |
| | | | | 118/694 |
| 6,063,195 A * | 5/2000 | Giesinger | ......... | B05B 12/085 |
| | | | | 118/712 |
| 7,110,104 B2 * | 9/2006 | Choi | ............. | G01N 21/8806 |
| | | | | 382/141 |
| 2004/0005403 A1 * | 1/2004 | Nesbitt | ............. | B05B 12/12 |
| | | | | 427/8 |

FOREIGN PATENT DOCUMENTS

| JP | 2011-235240 A | | 11/2011 |
|---|---|---|---|
| JP | 2014-97453 A | * | 5/2014 |
| JP | 5742743 | | 5/2015 |

\* cited by examiner

FIG.6

INSPECTION DEVICE AND INSPECTION METHOD

BACKGROUND OF THE INVENTION

Field of the Invention

The present invention relates to an inspection device and an inspection method for inspecting a height of a surface of powder resins loaded in a fluidizing tank.

Description of the Related Art

A known powder coating device performs powder coating on workpiece such as an electrical conductor used in a rotating electric machine. The powder coating device disclosed in Japanese Patent No. 5742743 comprises a powder fluidizing tank loaded with powder resins, a porous plate provided below the powder fluidizing tank, and an air feeding unit that feeds air to the powder fluidizing tank via the porous plate. The powder resins are made to flow by the air, the workpiece is inserted into the fluidized powder resins, and thereby power coating is performed on the electrical conductor.

When there is unevenness in the heights of the surface of the powder resins loaded in the powder fluidizing tank, unevenness in the powder coating on the workpiece may occur. The powder coating device disclosed in Japanese Patent No. 5742743 suppresses the occurrence of the unevenness in the powder coating on the workpiece by adjusting the angle of insertion of the workpiece into the powder fluidizing tank in accordance with the inclination of the surface of the powder resins.

However, when the angle of insertion of the workpiece into the powder fluidizing tank is adjusted in the powder coating device disclosed in Japanese Patent No. 5742743, the workpiece sometimes hits the side surface of the powder fluidizing tank. When the workpiece hit the side surface of the powder fluidizing tank, the powder resins may oscillate due to the impact at the time the former hit the latter, causing unevenness in the heights of the surface of the powder resins, which leads to unevenness in the powder coating on the workpiece.

The present invention has been made in view of the above-described aspect and an object of the present invention is to provide an inspection device and an inspection method that can urge suppression of occurrence of uneven powder coating on a workpiece.

SUMMARY OF THE INVENTION

An inspection device of the present invention is an inspection device inspecting a height of a surface of powder resins in a powder coating device, the powder coating device being adapted to feed air toward a fluidizing tank via a porous body provided below the fluidizing tank, wherein the fluidizing tank has closed-end sides and an open-end bottom, fluidize the powder resins loaded in the fluidizing tank, and subject a workpiece inserted into the fluidizing tank to powder coating, the inspection device including: a surface height measurement unit configured to measure the height of the surface of the powder resins loaded in the fluidizing tank at multiple positions; an index value computation unit configured to compute an index value indicative of a dispersion of measurement results measured by the surface height measurement unit at the multiple positions; and a notification unit configured to provide a predetermined notification indicating that the index value computed by the index value computation unit exceeds a first predetermined value in response to the index value exceeding the first predetermined value.

When clogging of the porous body occurs, fluidity of the powder resins in the fluidizing tank deteriorates and dispersion is created in the heights of the surface of the powder resins. When the dispersion of the heights of the surface of the powder resins becomes large, the uneven coating on the workpiece will also increase.

According to the inspection device of the present invention, when the dispersion of the heights of the surface of the powder resins exceeds the first predetermined value due to the clogging of the porous plate, this fact is notified. By specifying the first predetermined value as a value, the dispersion above which causes larger unevenness of coating on the workpiece, it is made possible to notify the fact that the uneven coating on the workpiece will increase and urge countermeasures to prevent the consequence.

It is preferable that the surface height measurement unit is configured to measure the height of the surface of the powder resins loaded in the fluidizing tank at a portion of the fluidizing tank where the workpiece is inserted.

According to this feature, it is possible to measure only the necessary portion, reduce waste, and improve efficiency.

It is preferable that the surface height measurement unit is arranged above the portion where the workpiece is inserted.

According to this feature, it is made possible to measure only the necessary part using a simple configuration.

It is preferable that the notification unit is configured to provide, as the predetermined notification, a notification urging replacement of the porous body.

According to this feature, it is possible to notify the time of replacement in accordance with the execution status of the first notification. For example, the index value may exceed the first predetermined value due to an external force or the like, making it difficult to determine whether or not the porous body should be immediately replaced in response to the index value having exceeded the first predetermined value. In view of this, the second notification should be performed when, as the execution status of the first notification, the first notification has been issued for a predetermined number of times (multiple times) within a predetermined period of time, which makes it possible to recognize the time of replacement at which the replacement should in fact be carried out.

It is preferable that a signal output unit is provided which is configured to output an insertion stop signal for stopping insertion of the workpiece into the fluidizing tank, the insertion stop signal being output in response to the index value computed by the index value computation unit exceeding a second predetermined value larger than the first predetermined value.

According to this feature, it is made possible to effectively and reliably prevent occurrence of uneven powder coating on the workpiece due to the clogging of the porous plate.

An inspection method according to the present invention is an inspection method of inspecting a height of a surface of powder resins in a powder coating device, the powder coating device being adapted to feed air toward a fluidizing tank via a porous body provided below the fluidizing tank, wherein the fluidizing tank has closed-end sides and an open-end bottom, fluidize the powder resins loaded in the fluidizing tank, and subject the workpiece inserted into the fluidizing tank to powder coating, the inspection method including: a surface height measurement step of measuring the height of the surface of the powder resins loaded in the fluidizing tank at multiple positions; an index value computation step of computing an index value indicative of a dispersion of measurement results at the multiple positions in the surface height measurement step; and a notification step of notifying a fact that the index value computed in the index value computation step has exceeded a predetermined value in response to the index value having exceeded the predetermined value.

According to the inspection method of this invention, it is made possible to provide a notification to the effect that the dispersion occurs in the heights of the surface of the powder resins due to the clogging of the porous plate leading to the problematic increase in the unevenness in the application on the workpiece and thereby urge countermeasures to prevent this problematic event.

DETAILED DESCRIPTION OF THE PREFERRED EMBODIMENTS

The embodiments of the present invention will be described hereinbelow with reference to the drawings.

First, an example of the structure of a rotary electric machine is described.

Figure 1:
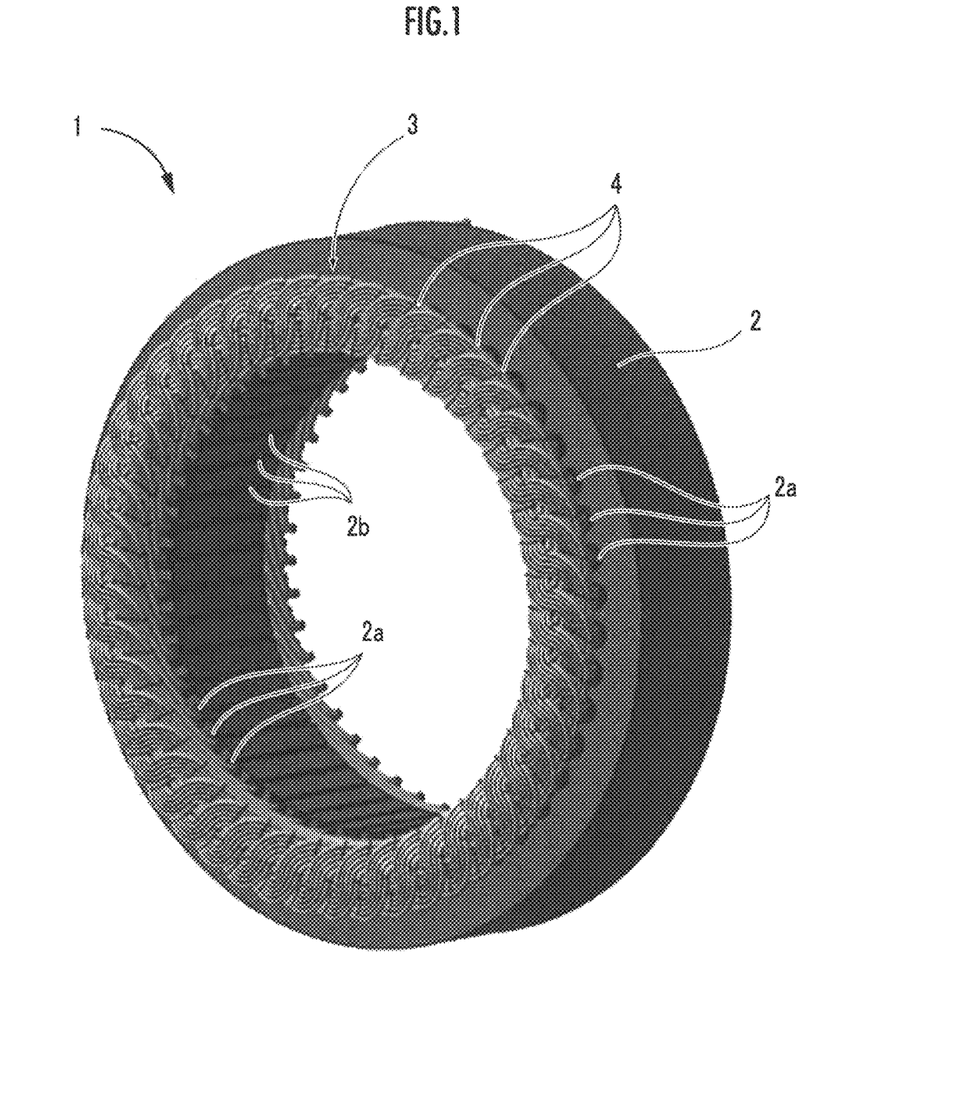
FIG. 1 is a perspective view illustrating a stator of a rotary electric machine.

As illustrated in FIG. 1, a rotary electric machine which may be an electric motor, an electric generator, etc. comprises a stator 1 formed in a cylindrical shape and a rotor (not shown) rotatably arranged inside the stator 1.

The stator 1 comprises a stator core 2 and a coil 3. The stator core 2 has a cylindrical shape and includes a plurality of slots 2a extending therethrough in the direction along the rotation axis, where the slots 2a are provided at intervals in the circumferential direction. Each slot 2a is formed such that a cross-sectional shape in the radial direction of the stator core 2 radially extends radially outward from the center of the stator core 2. Each slot 2a is in communication with the inner circumferential surface of the stator core 2 via a slit 2b formed in the stator core 2. It should be noted that the slit 2b may be omitted.

Figure 2:
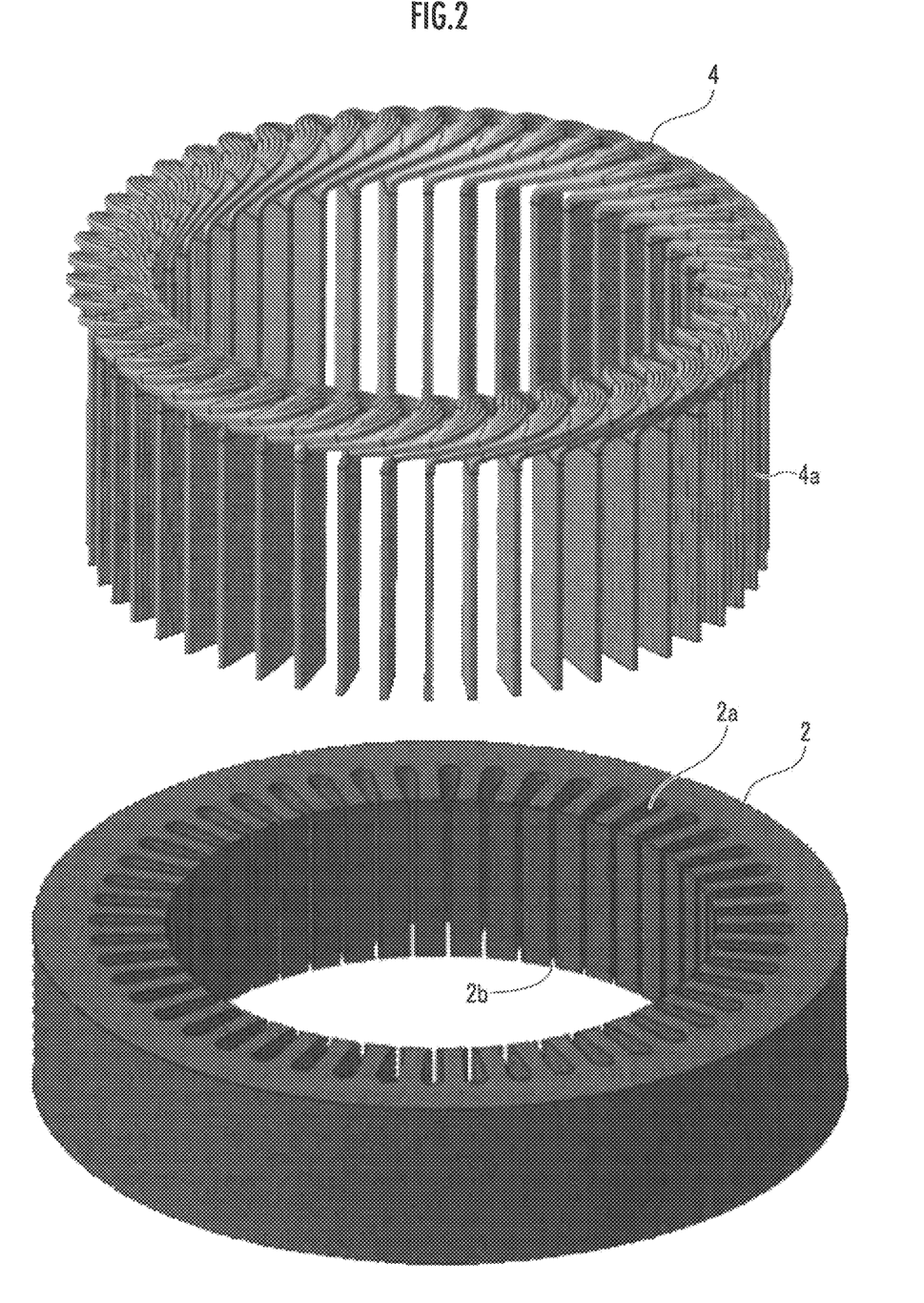
FIG. 2 is a perspective view illustrating a stator core and a coil segment.
Figure 3:
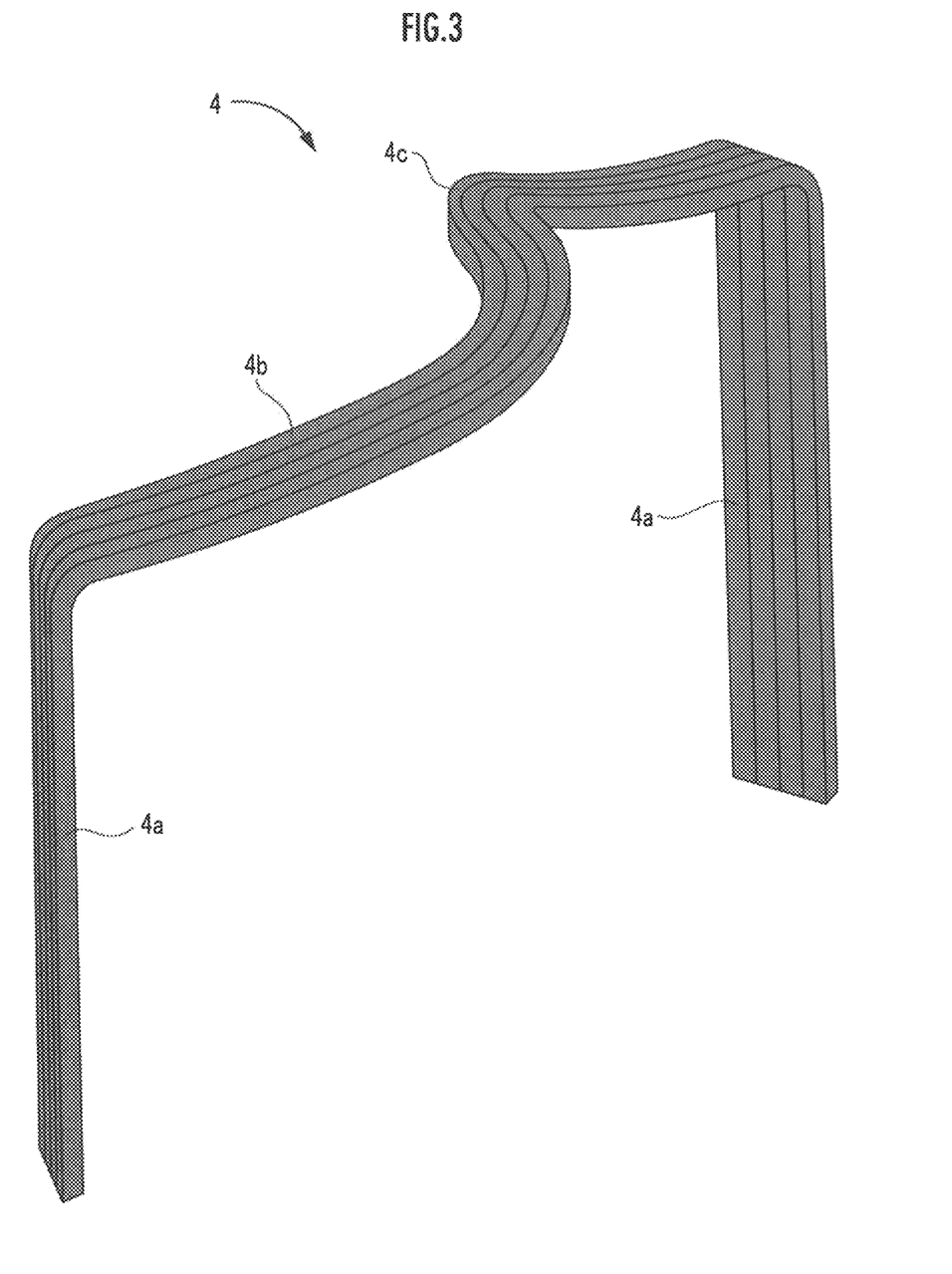
FIG. 3 is a perspective view illustrating the coil segment.

The coil 3 is configured by inserting a coil segment 4 illustrated in FIG. 3 into the slot 2a from one side thereof and bending a projecting portion 4d projecting from the other side of the slot 2a in the circumferential direction and then welding the projecting portion 4d.

The coil segment 4 is configured by aligning a plurality of conductors (four conductors in this embodiment) having a rectangular cross-section (conductors of rectangular wires) in one row so that their wide surfaces face with each other and bundling them in a U-shape. The coil segment 4 is constituted by a pair of leg sections 4a, 4a and a head section 4b interconnecting one ends of these two leg section 4a, 4a (the upper ends in the figure).

It should be noted that the coil segment 4 may be a bundle of multiple rectangular wires aligned in the width direction and, for example, the coil segment 4 may also be a bundle of rectangular wires aligned in one row such that their narrow surfaces face with each other.

An S-shaped section 4c curved in an S shape in the direction of alignment of the rectangular wires is formed at the center of the head section 4b. Also, the head section 4b is inclined from its center (the center of the S-shaped section 4c) toward the two leg sections 4a, 4a. The leg section 4a of the coil segment 4 is inserted into the corresponding slot 2a from one side thereof. The leg section 4a of the coil segment 4 projects from the other side of the slot 2a.

Figure 4A:
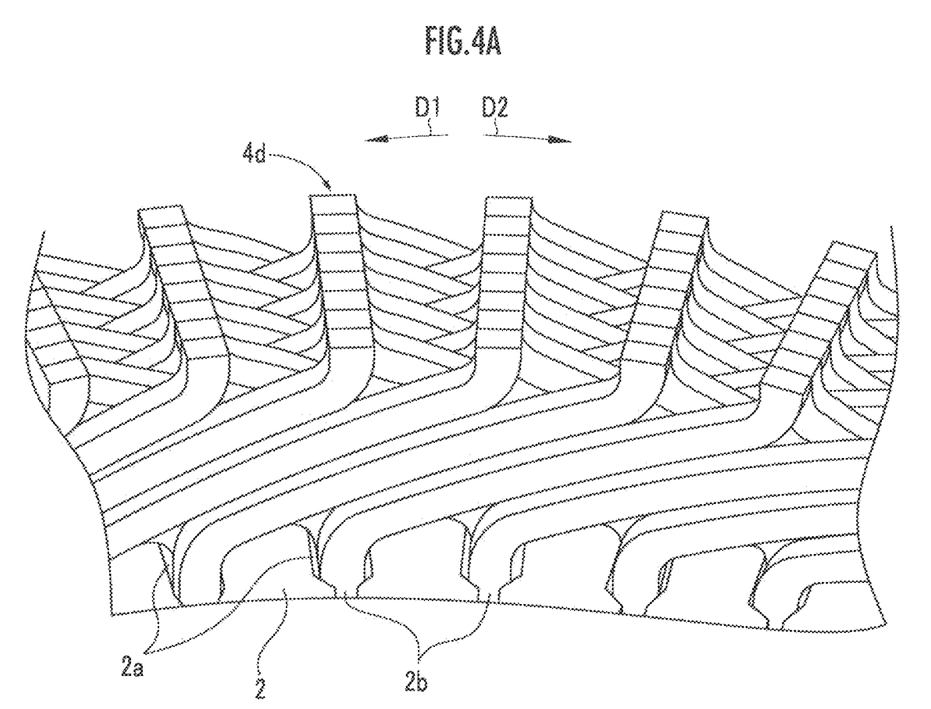
FIG. 4A is a perspective view illustrating a projecting section of the coil segment.

The projecting portion 4d of the leg section 4a projecting from the other side of the slot 2a is bent, as illustrated in FIG. 4A, by a bending device (not shown) in the circumferential direction of the stator 1, and the tip sections 4e of the corresponding projecting portions 4d are joined by welding by a welding device (not shown). In this manner, a stator 1 is completed which comprises eight layers of (eight) coil segments 4 are arranged in a stacked state in the radial direction. Here, the first layer, the second layer . . . and the eighth layer are arranged from the outer side to the inner side in the radial direction.

Figure 4B:
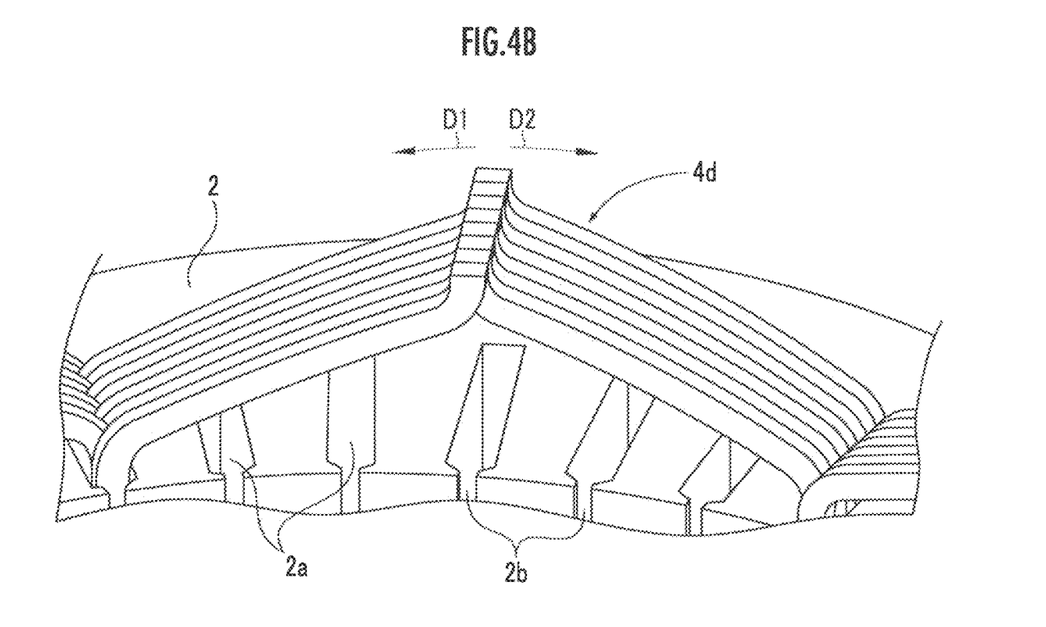
FIG. 4B is a perspective view illustrating a projecting section of the coil segment.

It should be noted that the coil 3 of this embodiment is a three-phase coil consisting of U-phase, V-phase, and W-phase. The leg sections 4a of the coil segment 4 inserted into the respective slots 2a are arranged in the order of U-phase, U-phase, V-phase, V-phase, W-phase, and W-phase. In FIG. 4B only one coil (e.g., a U-phase coil) out of the three phases is depicted.

(Powder Coating Device)

Figure 5:
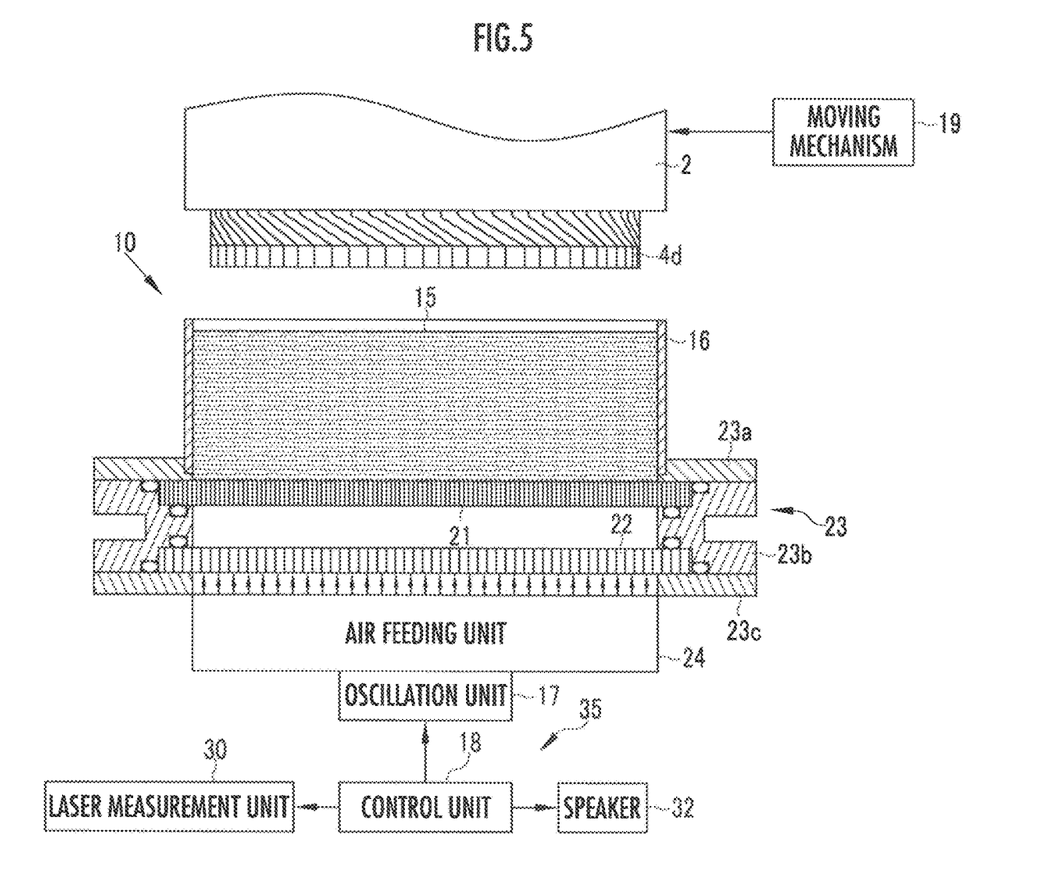
FIG. 5 is a schematic diagram illustrating a powder coating device.
Figure 6:
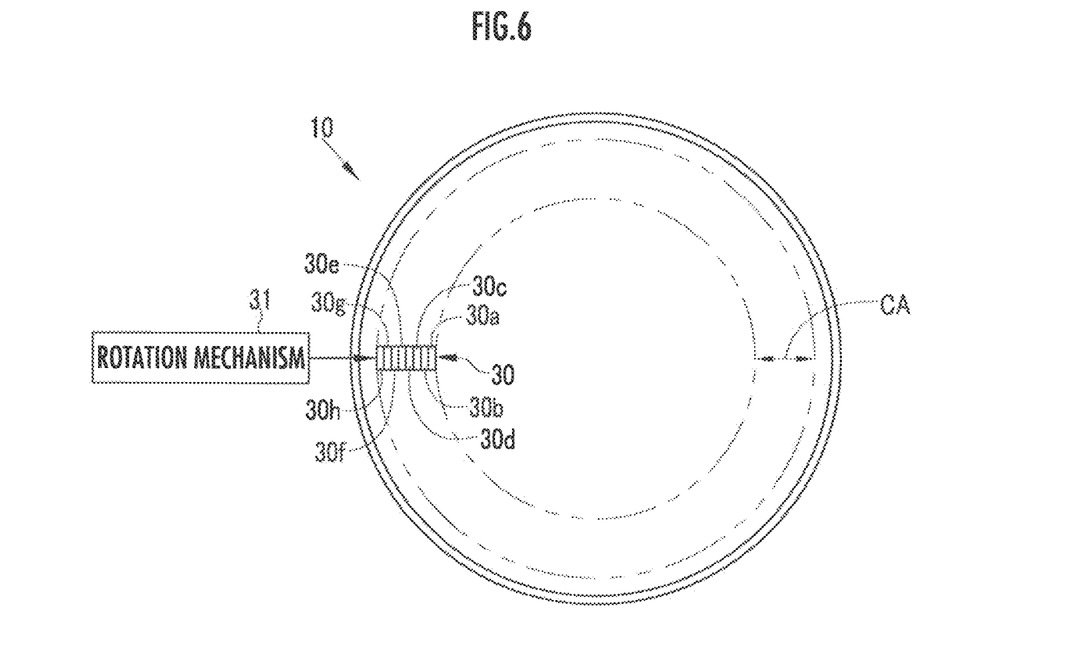
FIG. 6 is a schematic diagram illustrating the powder coating device.

Next, as illustrated in FIGS. 5 and 6, a powder coating device 10 will be described which performs powder coating on the projecting portion 4d of the leg section 4a of the coil segment 4 (workpiece) using a fluidized bed coating technique.

The powder coating device 10 comprises a powder fluidizing tank 16 loaded with powder resins 15 comprising resin having an insulating property (e.g., epoxy resin) and having a particle diameter of, for example, 55 µm (0.055 mm), and an oscillation unit 17 configured to oscillate the powder fluidizing tank 16. The powder fluidizing tank 16 has a closed-end sides and an open-end bottom. The oscillation unit 17 has an eccentric vibration motor or the like and is configured to oscillate the central-axis portion of the powder fluidizing tank 16 and thereby causes the powder fluidizing tank 16 to oscillate in the lateral direction and the axial direction.

Also, the powder coating device 10 comprises a control unit 18 configured to comprehensively control the powder coating device 10 and a stator moving mechanism 19 configured to hold and move the stator 1. Actuation of the oscillation unit 17 and the stator moving mechanism 19 is controlled by the control unit 18.

The powder coating device 10 comprises a first porous plate 21 and a second porous plate 22 (porous body) disposed below the powder fluidizing tank 16, a porous plate holding unit 23 configured to hold the first porous plate 21 and the second porous plate 22, and an air feeding unit 24. Actuation of the air feeding unit 24 is controlled by the control unit 18.

A plurality of holes with a diameter of for example 0.01 mm are formed in the first porous plate 21 and a plurality of holes with a diameter larger than the hole diameter of the first porous plate 21, for example, 2 mm, are formed in the second porous plate 22. It should be noted that the second porous plate 22 may be omitted as long as at least the first porous plate 21 is provided. Further, three or more porous plates may be provided.

The porous plate holding unit 23 comprises a first holding plate 23a, a second holding plate 23b, and a third holding plate 23c. The first holding plate 23a is detachably attached to the second holding plate 23b. The first porous plate 21 is held by and between the first holding plate 23a and the second holding plate 23b.

The third holding plate 23c is detachably attached to the second holding plate 23b. The second porous plate 22 is held by and between the third holding plate 23c and the second holding plate 23b. The porous plates 21, 22 and the holding plates 23a to 23c are each sealed by a ring-shaped rubber.

The air feeding unit 24 is disposed below the first porous plate 21. The air feeding unit 24 is configured to feed air upward toward the first porous plate 21 and the second porous plate 22.

The powder coating device 10 comprises a laser measurement unit 30 (surface height measurement unit) configured to measure the height of the surface of the powder resins 15, a rotation mechanism 31 configured to rotate the laser measurement unit 30 about a central axis extending in the up-and-down direction of the powder fluidizing tank 16, and a speaker 32 (notification unit). In this embodiment, the inspection device 35 that inspects the height of the surface of the powder resins 15 comprises the control unit 18, the laser measurement unit 30, the rotation mechanism 31, and the speaker 32.

The laser measurement unit 30 comprises first to eighth laser measurement sections 30a to 30h of a laser reflection type (surface height measurement unit) configured to measure the height of the surface of the powder resins 15. The first to eighth laser measurement sections 30a to 30h are provided one after another from the inner circumference so as to measure the height of the surface of the powder resins 15 at multiple locations (e.g., eight locations). While details will be described later, the projecting portions 4d of the eight coil segments 4 are inserted into the powder fluidizing tank 16. The range where the projecting portions 4d of the eight coil segments 4 are inserted defines the coil insertion range CA.

The first to eighth laser measurement sections 30a to 30h are arranged so as to measure the height of the surface of the powder resins 15 at each of the eight locations where the projecting portions 4d of the eight coil segments 4 are inserted. Actuation of the first to eighth laser measurement sections 30a to 30h is controlled by the control unit 18.

The surface height measurement unit that measures the height of the surface of the powder resins 15 is not limited to the laser measurement unit 30 that uses laser and can be modified as appropriate as long as it is capable of measuring the surface height. For example, a measurement unit that measures the surface height on the basis of an image of a surface of the powder resins 15 may be provided, and another contact-type unit may be provided that measures the surface height by being brought into contact with the surface of the powder resins 15.

(Powder Coating)

A case will be described below in which the powder coating is performed on the projecting portions 4d of the leg sections 4a of the coil segments 4 by the powder coating device 10. In the powder coating, first, the projecting portions 4d of the leg sections 4a of the coil segments 4 are heated to a temperature equal to or higher than the melting temperature of the powder resins 15 by a heating device (not shown).

The control unit 18 of the powder coating device 10 actuates the oscillation unit 17 to oscillate the powder fluidizing tank 16. Also, the control unit 18 actuates the air feeding unit 24 to feed air from the air feeding unit 24 to the second porous plate 22. The air that has been fed passes through the second porous plate 22 and the first porous plate 21 and sent to the powder fluidizing tank 16. The powder resins 15 loaded in the powder fluidizing tank 16 are made to flow as a result of the oscillation by the oscillation unit 17 and feeding of the air.

Specifically, since the oscillation unit 17 oscillates the central-axis portion of the powder fluidizing tank 16 and oscillates the powder fluidizing tank 16 in the lateral direction, the outer circumferential portion of the powder fluidizing tank 16 exhibits a larger oscillation than that of the central portion of the powder fluidizing tank 16. As a result, the outer circumferential portion of the powder fluidizing tank 16 will have a larger bulk density of the powder resins 15 than that at the central portion of the powder fluidizing tank 16.

Accordingly, it is more difficult for the air to pass through the outer circumferential portion of the powder fluidizing tank 16 than the central portion of the powder fluidizing tank 16. In other words, it is easier for the air to pass through the central portion of the powder fluidizing tank 16. As a result, the air passing through the central portion of the powder fluidizing tank 16 becomes an air flow that flows toward the outer circumferential portion of the powder fluidizing tank 16, as a result of which the powder resins 15 loaded in the powder fluidizing tank 16 is made to flow.

Figure 7:
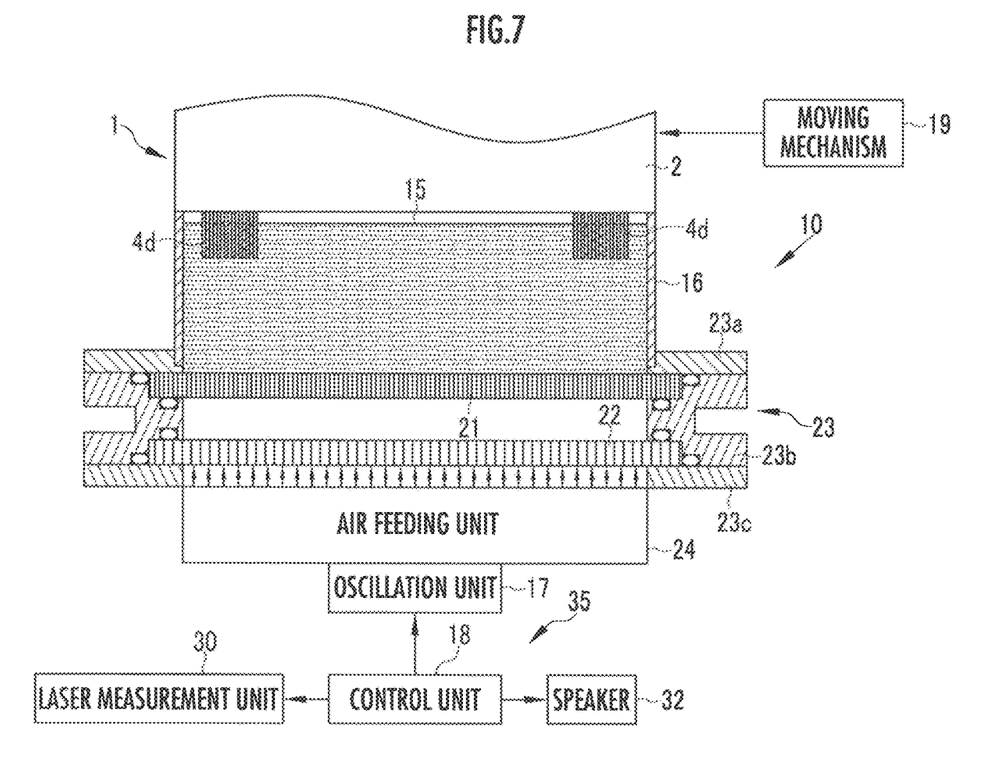
FIG. 7 is a schematic diagram illustrating the powder coating device in a state where projecting portions of leg sections of the coil segments are inserted into the powder fluidizing tank.

In addition, as illustrated in FIG. 7, the control unit 18 actuates the stator moving mechanism 19 to hold the stator 1 and move the stator 1 downward, and inserts the projecting portions 4d of the leg sections 4a of the coil segments 4 into the powder fluidizing tank 16 (powder coating step). It should be noted that FIG. 7 illustrates in a simplified manner the projecting portions 4d of the coil segments 4 as an end view along the shape of the projecting portion 4d.

The powder resins 15 flowing in the powder fluidizing tank 16 are brought into contact with the projecting portions 4d. Since the projecting portions 4d are heated to the temperature higher than the melting temperature of the powder resins 15, the powder resins 15 in contact with the projecting portions 4d are melted and a coating film is formed, and a state is established where powder coating has been performed on the projecting portions 4d.

After the control unit 18 has performed the powder coating for a predetermined period of time, the control unit 18 stops the actuation of the oscillation unit 17. Further, the control unit 18 actuates the stator moving mechanism 19 to move the stator 1 upward and removes the projecting portions 4d of the leg sections 4a of the coil segments 4 from the powder fluidizing tank 16.

The projecting portions 4d of the leg sections 4a of the multiple coil segments 4 removed from the powder fluidizing tank 16 are subjected to the powder coating and placed in an insulated state.

Further, the control unit 18 actuates the stator moving mechanism 19 to move the stator 1 sideways and evacuate the stator 1 from the above the powder fluidizing tank 16.

(Surface Height Measurement Step)

The control unit 18 of the inspection device 35, after having evacuated the stator 1 from the space above the powder fluidizing tank 16, actuates the first to eighth laser measurement sections 30a to 30h of the laser measurement unit 30. The first to eighth laser measurement sections 30a to 30h measures the heights of the surface of the powder resins 15 in the coil insertion range CA. Specifically, the first to eighth laser measurement sections 30a to 30h each emit a laser beam to irradiate the surface of the powder resins 15 in the coil insertion range CA with the laser beams, receive the reflected light therefrom, and measure the heights of the surface of the powder resins 15 on the basis of the received reflected light.

Also, the control unit 18 actuates the rotation mechanism 31 to rotate the first to eighth laser measurement sections 30a to 30h of the laser measurement unit 30 in the circumferential direction of the powder fluidizing tank 16. By virtue of this, the height of the surface of the powder resins 15 in the coil insertion range CA can be measured for the entire circumference.

In this embodiment, the control unit 18 actuates the first to eighth laser measurement sections 30a to 30h such that the surface heights at numerous points 250 points) in the circumferential direction of the powder fluidizing tank 16 for each predetermined angle (e.g., 1°) are measured by the first to eighth laser measurement sections 30a to 30h of the laser measurement unit 30. Further, the control unit 18 actuates the first to eighth laser measurement sections 30a to 30h such that the measurements are performed for each angular degree up to 360 times in the circumferential direction of the powder fluidizing tank 16.

(Index Value Computation Step)

The control unit 18 computes, as an index value indicative of the dispersion of the measurement results, the number of the points lower than the preset predetermined height among the measurement results at the multiple points (360×250 points and thus a total of 90,000 points in this embodiment) measured for each angular degree in the circumferential direction of the stator core 2 by the first to eighth laser measurement sections 30a to 30h. In this embodiment, the control unit 18 functions as the index value computation unit. The predetermined height can be modified as appropriate. It should be noted that an index value computation unit configured by a CPU or the like calculating the index may be provided separately from the control unit 18 comprehensively controlling the powder coating device 10.

It should be noted that, while the index value needs to be indicative of the dispersion of the measurement results, the index value is not limited to the number of points lower than the predetermined height among the measurement results at the multiple points. For example, the index value may be given as a difference between the maximum value and the minimum value among the measurement results at the multiple points, a deviation of the measurement results, a standard deviation of the measurement results, or the like. Further, the index value may be given as the number of measurement results that are smaller than the maximum value by a predetermined value or more.

(Determination Step)

The control unit 18 determines whether or not the computed index value exceeds the preset first predetermined value. A value used to determine that clogging of the first porous plate 21 occurs when the computed index value exceeds the value is specified as the first predetermined value.

The first predetermined value can be modified as appropriate. For example, if the first predetermined value is made smaller, clogging of the first porous plate 21 can be more strictly determined. If the first predetermined value is made larger, the determination of the clogging of the first porous plate 21 becomes less strict.

Even when dispersion occurs in the heights of the surface of the powder resins 15 (clogging of the first porous plate 21 occurs), the powder coating device 10 can perform the powder coating on the projecting portion 4d of the multiple coil segments 4 as long as the dispersion is small.

Meanwhile, if the dispersion of the heights of the surface of the powder resins 15 is large, then the powder coating device 10 may not be able to perform the powder coating on the projecting portion 4d of the multiple coil segments 4 (poor powder coating). As a result, it is preferable that the first predetermined value is specified as a value (e.g., 20) smaller than the upper limit (30) of the allowable range (e.g., 0 to 30) where the powder coating can be performed on the projecting portion 4d of the multiple coil segments 4. Specifically, the notification at the time of the computed index value exceeding the first predetermined value is intended to notify that immediate replacement of the first porous plate 21 is not necessary but the time of replacement is approaching.

When the control unit 18 has determined that the computed index value is equal to or less than the first predetermined value, the control unit 18 performs the powder coating on the coil segment 4 of the next stator 1 and, performs again the computation of the index value and the determination. When the control unit 18 has determined that the computed index value is equal to or less than the first predetermined value, the control unit 18 repeatedly performs the powder coating step and the computation and determination step.

(Notification Step)

When the control unit 18 has determined that the computed index value exceeds the first predetermined value, the control unit 18 issues the notification (predetermined notification) to output a sound indicating that the computed index value exceeds the first predetermined value from the speaker 32. It should be noted that in addition to or in place of the notification by the speaker 32, the notification may be provided by being displayed on a display unit (not shown) as a notification unit.

More specifically, the control unit 18 outputs a sound that urges replacement of the first porous plate 21 and the second porous plate 22 from the speaker 32. Also, in accordance with the status of the above-described notification, a step may be provided for performing the notification urging replacement of the first porous plate 21 and the second porous plate 22 (a notification that is the same as or different than the above-described notification). It should be noted that the notification is not limited to the one that urges the replacement. In any case, a notification should be provided which indicates that the computed index value exceeds the first predetermined value.

Further, when it has been determined that the computed index value exceeds the first predetermined value, the stator 1 is conveyed to the outside of the moving path by the stator moving mechanism 19. In addition, whether or not the powder resins 15 are sufficiently applied to the projecting portion 4d of the coil segment 4 is confirmed by the operator or a not-shown check device.

(Driving Stoppage Step)

When the control unit 18 has determined that the computed index value exceeds the preset second predetermined value, the control unit 18 outputs an actuation stop signal to the stator moving mechanism 19 such that the stator moving mechanism 19 is not actuated.

In this embodiment, the control unit 18 functions as a signal output unit configured to output an insertion stop signal for stopping the insertion of the coil segment 4 into the powder fluidizing tank 16. It should be noted that the determination of whether or not the computed index value exceeds the second predetermined value and the output of the actuation stop signal may be omitted.

When the audio output and the actuation stop signal output should be stopped, the operator operates the display unit. Accordingly, the fact that the clogging of the first porous plate 21 occurs can be effectively and reliably notified to the operator.

The second predetermined value can be modified as appropriate as long as it falls within a range of values larger than the first predetermined value. The second predetermined value is preferably a value near the upper limit (30) of the allowable range (0 to 30). When the second predetermined value is a value (e.g., 28) near the upper limit (30) of the allowable range (0 to 30), then the notification in the case where the computed index value exceeds the second predetermined value is intended to notify the fact that the first porous plate 21 and the second porous plate 22 need to be immediately replaced.

When the control unit 18 has determined that the computed index value exceeds the second predetermined value, the control unit 18 may continue the notification to the effect that the first porous plate 21 and the second porous plate 22 should be replaced from the speaker 32 and the output of the actuation stop signal until the first porous plate 21 and the second porous plate 22 are replaced. By virtue of this, it is made possible to effectively and reliably suppress poor powder coating because the powder coating is not performed on the coil segment 4 of the next stator 1 until the first porous plate 21 and the second porous plate 22 are replaced.

It should be noted that, while in the above-described embodiment, the heights of the surface of the powder resins 15 are measured at the eight locations where the projecting portions 4d of the eight coil segments 4 are inserted and the index value indicative of the dispersion of the eight measurement results is computed, the locations of the measurement are not limited to the regions where the projecting portions 4d of the eight coil segments 4 are inserted. The locations of measurement may be identified anywhere on the surface of the powder resins 15. For example, the heights of the surface of the powder resins 15 at the region traversing the central axis of the powder fluidizing tank 16 and the height of the surface of the powder resins 15 in the coil insertion range CA may be measured and a difference between them may be computed as the index value.

While the present invention is implemented on the inspection device 35 that inspects the height of the surface of the powder resins 15 for the powder coating on the projecting portion 4d of the coil segment 4 in the above-described embodiment, the object to be subjected to the powder coating is not limited to the projecting portion 4d of the coil segment 4 and the present invention can be implemented on inspection devices that inspect the height of the surface of the powder resins for powder coating on various workpieces.

What is claimed is:

1. An inspection device inspecting a height of a surface of powder resins in a powder coating device, the powder coating device being adapted to feed air toward a fluidizing tank via a porous body provided below the fluidizing tank, wherein the fluidizing tank has closed-end sides and an open-end bottom, fluidize the powder resins loaded in the fluidizing tank, and subject a workpiece inserted into the fluidizing tank to powder coating, the inspection device comprising:
   a surface height measurement unit which includes a plurality of measurement sections configured to measure the height of the surface of the powder resins loaded in the fluidizing tank at multiple positions, the plurality of measurement sections being arranged along a straight line orthogonal to an axis line extending in an up-down direction of the fluidizing tank;
   a rotation mechanism configured to rotate the surface height measurement unit about the axis line extending in the up-and-down direction of the fluidizing tank;
   an index value computation unit configured to compute an index value indicative of a dispersion of measurement results of the plurality of measurement sections at a plurality of rotation positions measured by the surface height measurement unit rotated by the rotation mechanism; and
   a notification unit configured to provide a predetermined notification indicating that the index value computed by the index value computation unit exceeds a first predetermined value in response to the index value exceeding the first predetermined value.

2. The inspection device according to claim 1, wherein the surface height measurement unit is configured to measure the height of the surface of the powder resins loaded in the fluidizing tank at a portion of the fluidizing tank where the workpiece is inserted.

3. The inspection device according to claim 2, wherein the surface height measurement unit is arranged above the portion where the workpiece is inserted.

4. The inspection device according to claim 1, wherein the notification unit is configured to provide, as the predetermined notification, a notification urging replacement of the porous body.

5. The inspection device according to claim 1, further comprising a signal output unit configured to output an insertion stop signal for stopping insertion of the workpiece into the fluidizing tank, the insertion stop signal being output in response to the index value computed by the index value computation unit exceeding a second predetermined value larger than the first predetermined value.

6. An inspection method of inspecting a height of a surface of powder resins in a powder coating device, the powder coating device being adapted to feed air toward a fluidizing tank via a porous body provided below the fluidizing tank, wherein the fluidizing tank has closed-end sides and an open-end bottom, fluidize the powder resins loaded in the fluidizing tank, and subject a workpiece inserted into the fluidizing tank to powder coating, the inspection method comprising:
   a surface height measurement step of measuring the height of the surface of the powder resins loaded in the fluidizing tank at multiple positions, using a surface height measurement unit which includes a plurality of measurement sections configured to measure the height of the surface of the powder resins loaded in the fluidizing tank at multiple positions, the plurality of measurement sections being arranged along a straight line orthogonal to an axis line extending in an up-down direction of the fluidizing tank;
   a rotation step of rotating surface height measurement unit about the axis line extending in the up-and-down direction of the fluidizing tank, while performing the surface height measurement step;

an index value computation step of computing an index value indicative of a dispersion of measurement results of the plurality of measurement sections at a plurality of rotation positions in the surface height measurement step; and a notification step of notifying a fact that the index value computed in the index value computation step has exceeded a predetermined value in response to the index value having exceeded the predetermined value.

* * * * *